W. H. CROSBY.
CARPENTER'S PLANE.
APPLICATION FILED MAR. 4, 1910.
978,360.
Patented Dec. 13, 1910.
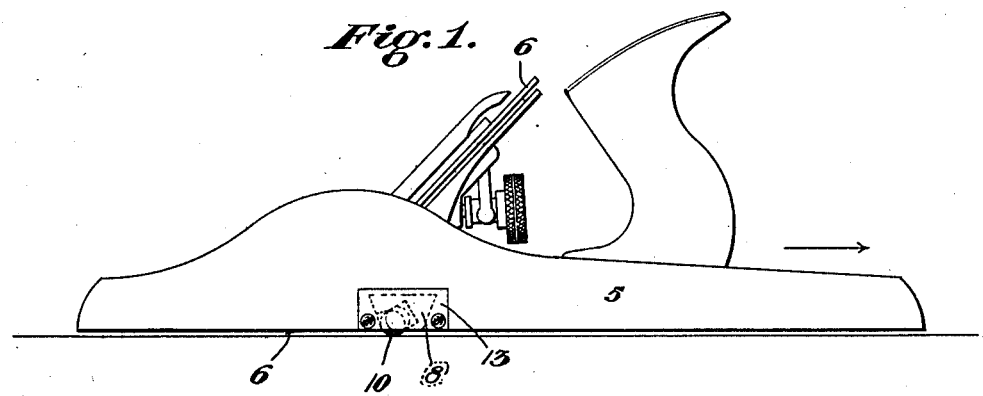
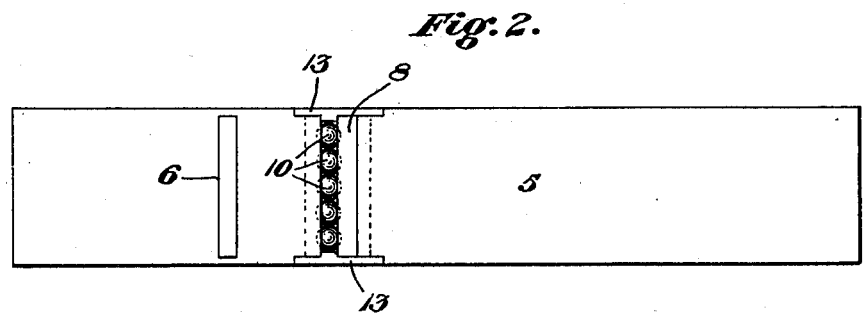
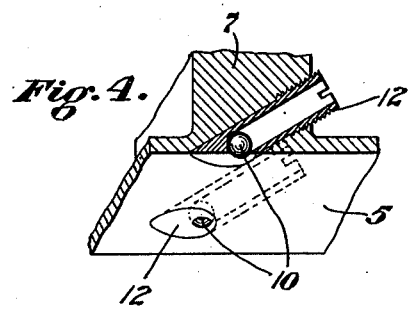
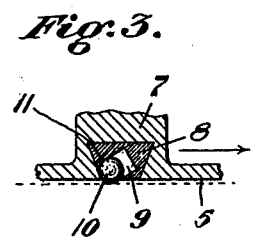
Witness:
Chas. S. Ripley.
Fred'k. Staub
Inventor,
William H. Crosby
By F. W. H. Clay
his Atty.

UNITED STATES PATENT OFFICE.

WILLIAM H. CROSBY, OF PITTSBURG, PENNSYLVANIA.

CARPENTER'S PLANE.

978,360.  Specification of Letters Patent.  Patented Dec. 13, 1910.

Application filed March 4, 1910. Serial No. 547,349.

*To all whom it may concern:*

Be it known that I, WILLIAM H. CROSBY, a citizen of the United States, residing at Pittsburg, in the State of Pennsylvania, have invented certain new and useful Improvements in Carpenters' Planes, of which the following is a specification.

My invention relates to the class of tools in which there is an element which cuts on a forward stroke and then is dragged backward over the work. It may be applied to several metal working tools but is here illustrated as applied to a carpenter's plane, the primary object of the invention being to automatically lift the cutting element off of the work when the tool is drawn backward.

Other objects are to provide a bearing which allows of movement in any direction over the surface, and which recedes on the forward stroke so as not to interfere with the proper contact for making a true cut.

In the accompanying drawing illustrating the invention, Figure 1 is a side elevation of a carpenter's plane and Fig. 2 an under plan. Fig. 3 is a partial vertical central section. Fig. 4 is a partial section and perspective view of modified form.

It will be recognized that the bit of a carpenter's plane is very quickly dulled by dragging it backward over the work in order to make a new stroke for cutting. At the same time there are many advantages from the smooth bottom of the plane being in perfect contact with the work during the forward stroke of the plane. My invention furnishes a bearing to lift the bit on a backward stroke while leaving the plane perfectly free to come in contact with the wood on the forward stroke; and incidentally it allows of turning the plane in any angle in either the forward or the backward motion. Thus in the drawing I represent an iron plane body 5, and behind the bit 6, preferably in the strengthening rib 7, I insert a bearing block 8 having a slot 9 of proper shape to receive one or more balls 10, the slot being so arranged that on the backward stroke of the plane, the balls roll against the bearing surface 11, and on the forward stroke the ball recedes in the slot 9 to the position indicated in dotted lines in Fig. 1. The block 8 may simply have a driving fit and any convenient means for retaining the balls in the slot 9, may be provided. I show a plate 13 mortised in the side of the plane body. It will be noted that by use of ball-bearings, the plane may be turned in any direction and is not forced to travel in any particular line as would be the case with rollers.

The device is very simple and easily made, the cross-slots both for reception of the block 8 and the bearing slot 9, being conveniently planed to make a true fit.

The essential feature of the invention can be much simplified, as for example, it is merely necessary to drill a slanting hole in the rib 7, stopping the drill just before it emerges so as to leave a bearing shoulder to prevent the ball rolling through. In Fig. 4 I have shown a modification in which this slanting hole is lined with a steel sleeve 12 bored out as described. It can be secured in place and ground on the under surface before boring the opening to receive the balls 10.

Having thus described my invention and illustrated its use, I claim the following:

1. A plane provided with a non-directional bearing mounted to recede beyond the surface of the face of the plane on a forward stroke, and to automatically drop into position to raise the plane on a backward stroke.

2. A plane provided with ball bearings operative to lift the plane off the work on a backward stroke, substantially as described.

3. The combination with a plane of a bearing block set in its face and having a slot arranged with an elongated dimension at a small angle to the surface of the face, and balls in said slot adapted to drop to a low position when in contact with the wood on a backward stroke and to lift freely and recede on a forward stroke.

4. The combination with a plane of a block set crosswise in its face and arranged to support therein a series of ball bearings, substantially as described.

5. The combination with a plane of a ball bearing mounted in the face thereof and bearing surfaces set on an incline so that the ball is automatically lifted out of operative position on a forward stroke of the plane.

In testimony whereof I have hereunto signed my name in the presence of the two subscribed witnesses.

WILLIAM H. CROSBY.

Witnesses:
 F. W. H. CLAY,
 FREDK. STAUB.